United States Patent
Ganz et al.

[11] Patent Number: 5,545,261
[45] Date of Patent: Aug. 13, 1996

[54] SOLAR ROOF FOR MOTOR VEHICLES

[75] Inventors: Thomas Ganz, Stockdorf; Berthold Lutz, Unterbachern; Bernhard Liedl, Munich; Alfons Weissbrich, Gauting, all of Germany

[73] Assignee: Webasto Karosseriesysteme GmbH, Germany

[21] Appl. No.: 455,854

[22] Filed: May 31, 1995

[30] Foreign Application Priority Data

Jun. 1, 1994 [DE] Germany .......................... 44 19 177.4

[51] Int. Cl.⁶ .......................... H01L 31/048; B60J 7/043
[52] U.S. Cl. .......................... 136/251; 136/291; 296/215; 296/216
[58] Field of Search .......................... 136/251, 291; 296/215, 216

[56] References Cited

U.S. PATENT DOCUMENTS

| | | | |
|---|---|---|---|
| 4,592,436 | 6/1986 | Tomei | 180/2.2 |
| 4,717,790 | 1/1988 | Gochermann | 136/251 |
| 5,011,544 | 4/1991 | Gaddy et al. | 136/246 |
| 5,059,254 | 10/1991 | Yaba et al. | 136/251 |
| 5,154,481 | 10/1992 | Paetz et al. | 296/211 |
| 5,213,626 | 5/1993 | Paetz | 136/244 |
| 5,228,925 | 7/1993 | Nath et al. | 136/251 |

FOREIGN PATENT DOCUMENTS

| | | | |
|---|---|---|---|
| 0459180 | 12/1991 | European Pat. Off. | 136/291 |
| 3044586 | 5/1982 | Germany | 136/291 |
| 3830484A1 | 3/1989 | Germany . | |
| 4017670A1 | 12/1991 | Germany . | |
| 4336223C1 | 9/1994 | Germany . | |
| 59-32521 | 2/1984 | Japan | 136/291 |

*Primary Examiner*—Aaron Weisstuch
*Attorney, Agent, or Firm*—Sixbey, Friedman, Leedom & Ferguson, P.C.; David S. Safran

[57] ABSTRACT

Solar roof for motor vehicles with a solar generator having solar cells for supplying power to a power consumer and/or a battery and with a D.C. converter for impedance matching between the solar generator and the consumer and/or battery. The D.C. converter is a flat module and is integrated into the solar cell carrying roof panel.

8 Claims, 2 Drawing Sheets

5,545,261

SOLAR ROOF FOR MOTOR VEHICLES

BACKGROUND OF THE INVENTION

1. Field of the Invention

The invention relates to a solar roof for motor vehicles with a solar generator composed of solar cells for supplying power to a power consumer and/or battery, and with a D.C. converter which is used for impedance matching between the solar generator and the power consumer and/or battery.

2. Description of Related Art

Solar roofs of this type are known from the journal "Sonnenenergie" [Sun Energy] 1/88, pages 9 through 11 and German Patent Application 40 17 670 A. A circuit suitable for one such solar roof is explained in particular in patent application P 43 36 223.0.

In known motor vehicle solar roofs, the D.C. converter is designed and used as a module which is placed anywhere in the vehicle, best in the vicinity of the roof drive, in a remaining unused space. In view of the vehicle superstructure which is compact, especially in passenger cars, these residual spaces are generally limited geometrically and volumetrically. Therefore, implementation of the D.C. converter module is largely dependent on the particular vehicle model; this makes manufacture and storage more expensive. As the result of the distributed components, retrofitting and service on the solar system are expensive. The compactness of the system leaves much to be desired.

SUMMARY OF THE INVENTION

Thus, it is a primary object of the present invention is to devise a solar roof for motor vehicles which at least largely eliminates the aforementioned defects.

This object is achieved, according to the invention, by forming the D.C. converter as a flat module and integrating it into the solar roof, for a solar roof of the type mentioned initially.

In a solar roof, in the dimension of width and length, a large amount of space is available which is limited only one dimensionally, specifically in construction height. This space is used according to the invention by the flat execution of the D.C. converter, the solar cells and the D.C. converter forming one unit, both in terms of circuit engineering and also physically.

The solar roof according to the invention allows simple application in the modular system and optionally also as a retrofit solution. The solar roof according to the invention is especially customer-friendly since vehicle-side cabling between the solar generator and D.C. converter is eliminated to a large extent or in its entirety. The new solar roof also allows simple diagnosis in case of a fault, since a qualified function test is possible both on the installed and on the dismounted solar roof. The short cable lengths or optionally complete elimination of cables on the input side of the D.C. converter largely reduced the problems of electromagnetic compatibility (EMC). Moreover, it is guaranteed that the D.C. converter automatically assumes largely the same temperature as the solar generator; this makes it possible to increase the efficiency of the system via temperature adjustment of the MPP (maximum power point) voltage.

In a solar roof with at least one adjustable solar cover and an inside roof fining located under it, the D.C. converter is preferably housed in the construction space which remains between the solar roof and the inside roof lining and which can also be used to accommodate additional modules of the solar power supply and/or solar cover control, for example, other electronic components of the solar power supply and/or a rain sensor and its electronics.

In the case of an opaque solar cover, especially in a solar generator equipped with crystalline solar cells, the D.C. converter can be placed anywhere on the bottom of the solar cover. In terms of area, it can be at most as large as the solar module and it can be executed simply in the form of additionally applied layers (for example, using thin film or thick film technology). In a partially transparent solar roof, for example, a cover in which a solar module with amorphous solar cells is mounted on the inside sheet metal of the cover, the D.C. converter sits preferably under an opaque part of the solar cover, for example, in the area of the inside sheet metal of the cover.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
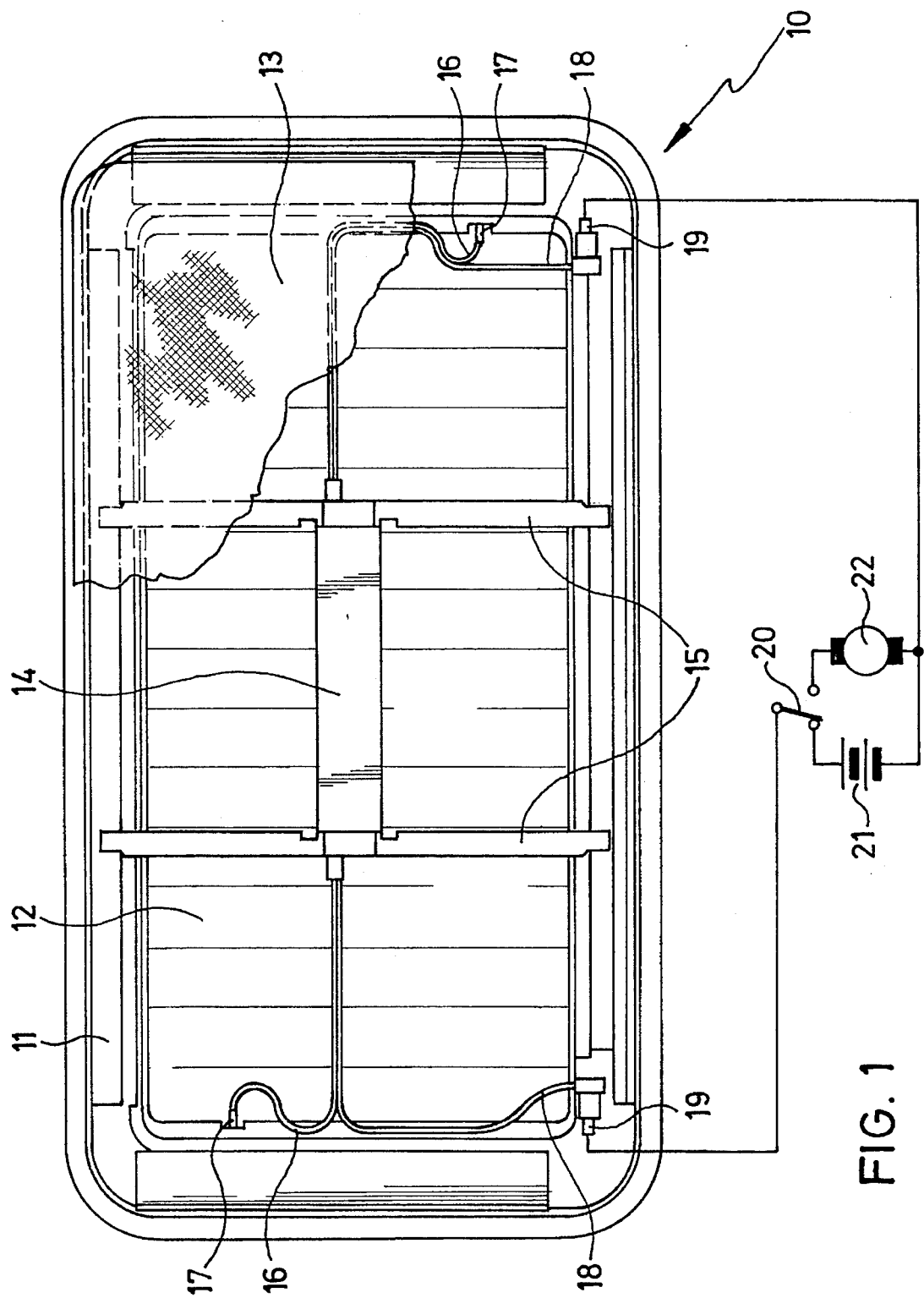
FIG. 1 shows a bottom view of a completely opaque solar cover.

The solar cover labelled 10 overall in FIG. 1 can be structured in any known way (for example, see German Patent Applications 38 30 484 A1 and 40 20 655 C1) and therefore does not require further explanation. Here, it is assumed that, in the embodiment according to FIG. 1, the solar cover is opaque, and therefore, in particular, is equipped with crystalline solar cells. The inside sheet metal of the cover is labelled 11. A solar module is labelled 12. In the installed state, the bottom of solar cover 10 is lined by an inside roof lining 13 facing toward the inside (e.g., passenger compartment) of the motor vehicle. A D.C. converter 14 made as a flat module is housed in a central part of solar cover 10 in a space between the solar module 12 and the inside roof lining 13. In the embodiment shown, the D.C. converter 14 sits on the bottom of the solar cover between crosspieces 15 which are joined to the inside sheet metal 11 of the cover. Via short cables 16 and connections 17, the D.C. converter 14 is connected on an input side to solar module 12. The output of the D.C. converter 14 is connected via additional cables 18 to output connections 19 in the form of so-called solar contacts. Output connections 19, for their part, can be connected, for example, via a selector switch 20 to a battery 21 or to a power consumer 22, for example, a fan motor. Selector switch 20 can be selectively designed for manual and/or automatic, for example, temperature-dependent, actuation.

Figure 2:
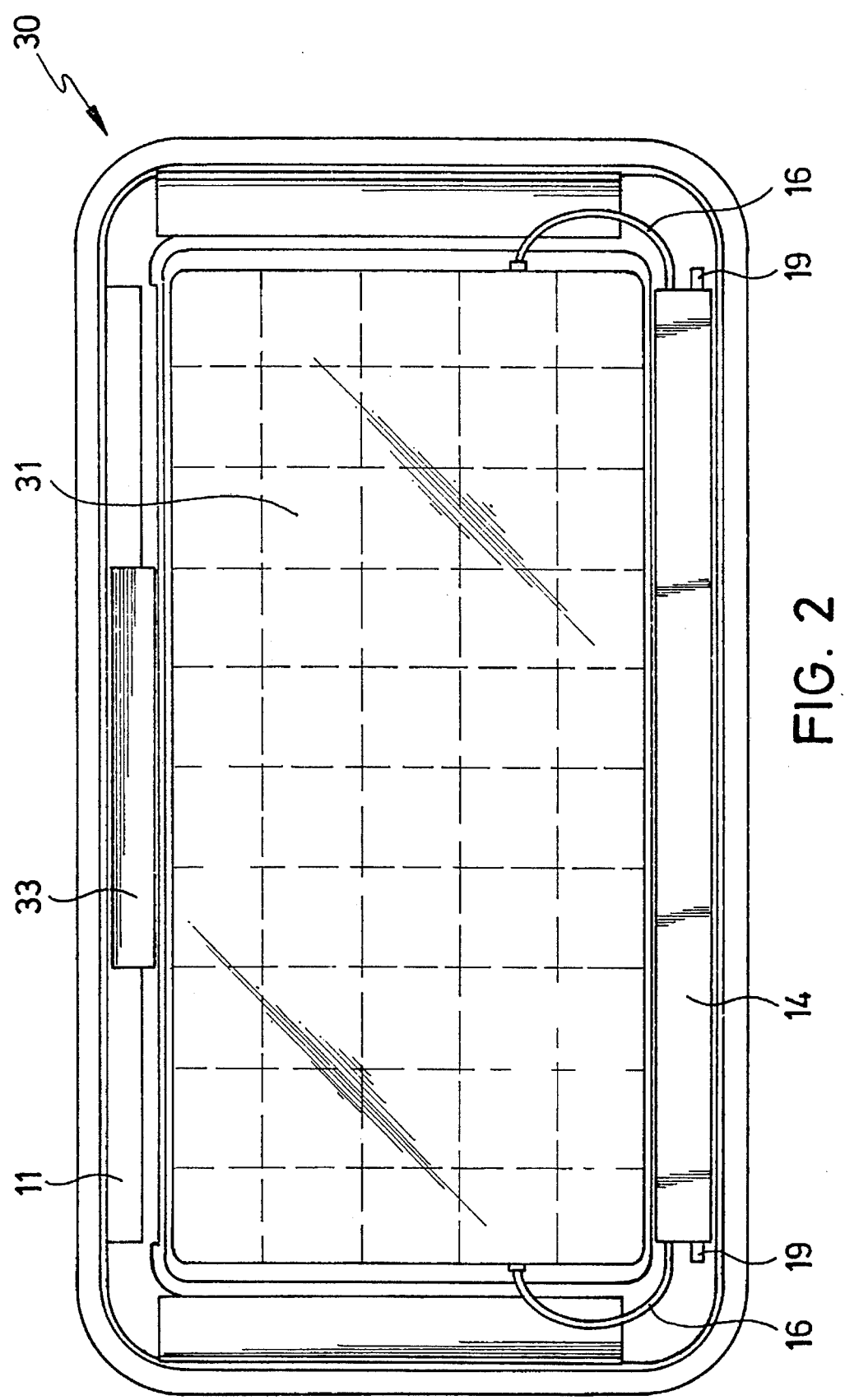
FIG. 2 is a view similar to that of FIG. 1 but of a partially transparent solar cover.

In the modified embodiment according to FIG. 2, the solar cover 30 is equipped with a transparent solar module 31, for example, a solar module of amorphous solar cells. Solar cover 30 has, like solar cover 10, an inside sheet metal 11, and it is therefore partially transparent overall. D.C. converter 14 is mounted on the bottom of the inside sheet metal 11 of the cover.

An electronic module is labelled 33 which, likewise, sits on the bottom of the inside sheet metal 11 of the cover and which, for example, can contain other electronic components of the solar power supply or a rain sensor solar cover control with the pertinent electronics.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A solar roof for motor vehicles comprising a movable roof panel, solar generator carried by said roof panel and composed of solar cells for supplying power to at least one of a power consumer and a battery, and a D.C. converter for impedance matching between the solar generator and the at least one of the power consumer and the battery; wherein the D.C. converter is a flat module and is integrated into the movable roof panel.

2. Solar roof according to claim 1, wherein an inside roof lining is located under the movable cover panel; and wherein the D.C. converter is housed in a construction space existing between the movable cover panel and the inside roof lining.

3. Solar roof according to claim 2, wherein at least one additional module is integrated into the movable cover panel.

4. Solar roof according to claim 3, wherein the at least one additional module is at least one of a solar power supply and a solar cover control.

5. Solar roof according to claim 4, wherein the movable cover panel with the solar cells thereon forms a partially transparent solar cover; and wherein the D.C. converter sits under an opaque part of the solar cover.

6. Solar roof according to claim 4, wherein the movable cover panel with the solar cells thereon forms a partially transparent solar cover; and wherein the D.C. converter sits under an opaque part of the solar cover.

7. Solar roof according to claim 1, wherein at least one additional module is integrated into the movable cover panel.

8. Solar roof according to claim 3, wherein the at least one additional module is at least one of a solar power supply and a solar cover control.

* * * * *